(12) United States Patent
Umeki et al.

(10) Patent No.: US 11,852,953 B2
(45) Date of Patent: Dec. 26, 2023

(54) OPTICAL ELEMENT AND MANUFACTURING METHOD THEREOF

(71) Applicant: Nippon Telegraph and Telephone Corporation, Tokyo (JP)

(72) Inventors: Takeshi Umeki, Musashino (JP); Takushi Kazama, Musashino (JP); Takahiro Kashiwazaki, Musashino (JP); Koji Embutsu, Musashino (JP); Osamu Tadanaga, Musashino (JP); Asuka Inoue, Musashino (JP); Ryoichi Kasahara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/779,958

(22) PCT Filed: Dec. 3, 2019

(86) PCT No.: PCT/JP2019/047255
§ 371 (c)(1),
(2) Date: May 25, 2022

(87) PCT Pub. No.: WO2021/111525
PCT Pub. Date: Jun. 10, 2021

(65) Prior Publication Data
US 2022/0413355 A1    Dec. 29, 2022

(51) Int. Cl.
*G02F 1/377*    (2006.01)
*G02F 1/355*    (2006.01)
(Continued)

(52) U.S. Cl.
CPC ......... *G02F 1/3775* (2013.01); *G02B 6/1223* (2013.01); *G02B 6/1342* (2013.01);
(Continued)

(58) Field of Classification Search
None
See application file for complete search history.

(56) References Cited

U.S. PATENT DOCUMENTS 6,792,189 B2 * 9/2004 Sasaura ................ G02F 1/3551
117/948
7,573,921 B2 * 8/2009 Yumoto ................ G02F 1/3775
372/20
(Continued)

FOREIGN PATENT DOCUMENTS

JP    2002-169044 A    6/2002
JP    3432993 B2 *    8/2003    ............. G02B 6/122
(Continued)

OTHER PUBLICATIONS

Sunao Kurimura et al., *Quasi-Phase-Matched Adhered Ridge Waveguide in LiNbO₃*, Applied Physics Letters, vol. 89, No. 19, 2006, p. 191123-1-191123-3.
(Continued)

*Primary Examiner* — Rhonda S Peace
(74) *Attorney, Agent, or Firm* — Workman Nydegger

(57) ABSTRACT

A highly-efficient ridge waveguide includes a base substrate of a single-crystal and a core substrate made of a nonlinear optical medium, the base substrate and the core substrate being directly bonded, and includes a thin film layer formed on a surface of the core substrate on the upper side of a periodically polarization-reversed structure, and becomes a wavelength conversion element. A direct bonding method through thermal diffusion is applied to bonding. The core substrate has a ridge structure formed in a light propagating direction and a reversed structure formed by processing this. A surface of the core substrate is ground and a thin film layer is formed on the ground surface. A core formed by digging a core layer of the core substrate in an unbonded state is provided on an upper surface of an undercladding layer of (Continued)

the base substrate in a bonded state. Two side surfaces of the core are in contact with an air layer.

12 Claims, 6 Drawing Sheets

(51) Int. Cl.
G02B 6/122 (2006.01)
G02B 6/134 (2006.01)
G02B 6/12 (2006.01)

(52) U.S. Cl.
CPC .... *G02F 1/3551* (2013.01); *G02B 2006/1204* (2013.01); *G02B 2006/12097* (2013.01)

(56) References Cited

U.S. PATENT DOCUMENTS 7,864,409 B2 * 1/2011 Yang .................... G02F 1/3558
359/328
2003/0223722 A1 * 12/2003 Sugita .................... G02B 6/136
385/129
2004/0136674 A1 * 7/2004 Hong .................... G02B 6/122
385/132
2013/0100977 A1 * 4/2013 Smeeton ................. G02F 1/377
427/160
2022/0413355 A1 * 12/2022 Umeki .................... G02F 1/377

FOREIGN PATENT DOCUMENTS

| JP | 2006-65046 A | 3/2006 | |
| JP | 2007-171452 A | 7/2007 | |
| JP | 3999748 B2 * | 10/2007 | ........... G02F 1/3775 |
| JP | 2019-105808 A | 6/2019 | |

OTHER PUBLICATIONS

Yoshikaju Zikuhara et al., *Sequential Activation Process of Oxygen RIE and Nitrogen Radical for LiTaO$_3$ and Si Wafer Bonding*, ECS Transactions, vol. 3, No. 6, 2006, pp. 91-98.

* cited by examiner

Prior Art

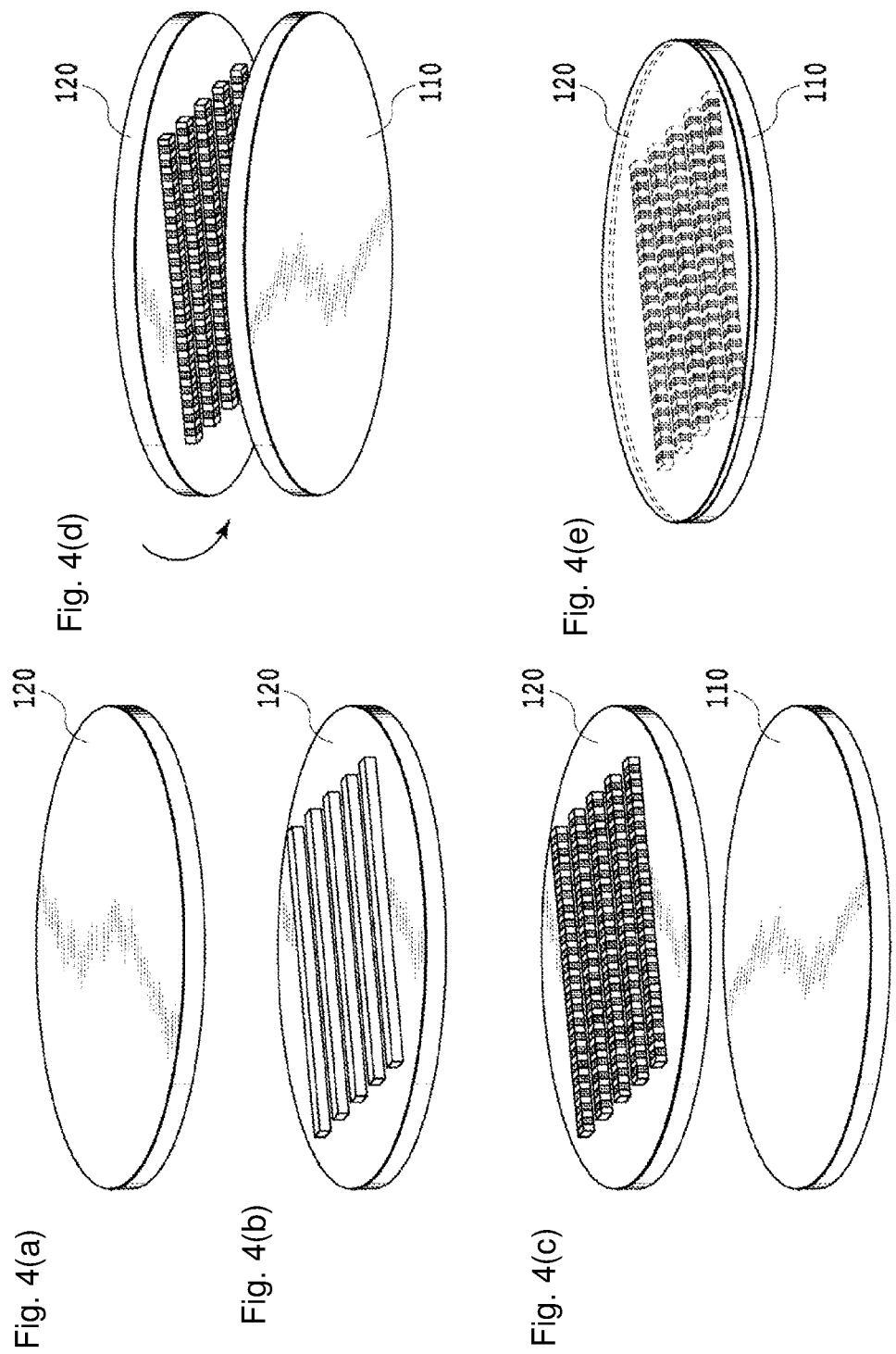

OPTICAL ELEMENT AND MANUFACTURING METHOD THEREOF

TECHNICAL FIELD

The present invention relates to an optical element using a nonlinear optical effect or an electro-optic effect (EO effect) for use in an optical communication system, an optical measurement system, and the like, as well as a method of manufacturing the optical element.

BACKGROUND ART

An optical element conventionally used for wavelength conversion of an optical signal in an optical communication system, an optical measurement system, and the like, optical modulation, optical measurement, optical processing, medical care, biological engineering, and the like is capable of generating or modulating coherent light ranging through the ultraviolet range, visible range, infrared range, and terahertz range. Nonlinear optical devices, electro-optic devices, and the like are being developed as such optical elements. Various materials for nonlinear optical media, electro-optic media, and the like are also being researched and developed.

For example, an oxide-based compound substrate of lithium niobate $LiNbO_3$ (hereinafter referred to as LN) or the like is known as a promising material having a very high second-order nonlinear optical constant and a very high electrooptical constant. As an example of optical devices using high nonlinearity of LN, periodically poled lithium niobate (PPLN) that is periodically polarization-reversed is known. Wavelength conversion elements using second harmonic generation (hereinafter denoted by SHG), difference frequency generation (hereinafter denoted by DFG), sum frequency generation (hereinafter denoted by SFG), and the like achieved by PPLN are known.

As an example, development of a compact mid-infrared light source is required, since a strong absorption line such as normal vibration of various environmental gases exists in a wavelength range of mid-infrared light having a wavelength of 2 to 5 µm. A light source to which DFG that can use a technologically developed excitation light source around 1 µm and signal light in a communication wavelength band is applied is considered to be promising for such a light source in the infrared range. A wavelength range difficult to achieve with semiconductor laser exists in a wavelength range of visible light around a wavelength of 0.5 µm. Thus, a wavelength conversion technology capable of generating visible light such as green light by SHG, SFG, and the like using the excitation light source around 1 µm is promising. Furthermore, through use of a wavelength conversion technology using DFG, light in a band of a wavelength of 1.55 µm used for optical fiber communication can be converted collectively into another wavelength band.

Utilizing the above-described characteristics, the wavelength conversion element can be applied to optical routing in a wavelength division multiplexing system, avoidance of collision of wavelengths in optical routing, and the like. The wavelength conversion element is thus considered as one of key devices that establish a high-capacity optical communication network. The wavelength conversion technology using DFG can perform signal distortion compensation utilizing the fact that converted light becomes phase conjugate light for signal light. When signal light is converted into phase conjugate light by the wavelength conversion element at an intermediate point of a transmission path, the signal light can be propagated such that dispersion occurred on the transmission path before conversion, signal distortion produced by the nonlinear optical effect in fibers, and the like are cancelled out on the transmission path after conversion. Therefore, the wavelength conversion element also serves as a key device that can reduce dispersion, nonlinear signal distortion, and the like.

When the wavelength conversion element having high wavelength conversion efficiency is used, transition of energy from excitation light power to signal light allows an amplifier of signal light called optical parametric amplification to be configured. In particular, future utilization of a phase sensitive amplifier having amplification properties in correspondence to the phase relation between excitation light and signal light is expected as a technology that enables low-noise optical amplification. To increase the efficiency of the wavelength conversion element using PPLN, an optical waveguide type device is effective. This is because the wavelength conversion efficiency is in proportion to power density of light that propagates through a nonlinear medium, and by forming a waveguide structure, light can be confined to a limited region. Under such circumstances, various waveguides using a nonlinear medium are being researched and developed.

In recent years, use of a Ti diffusion waveguide and a diffusion waveguide called a proton-exchanged waveguide is being studied. However, these diffusion waveguides diffuse impurities into crystals during fabrication, which raises a problem in terms of resistance to optical damage, long-term reliability, and the like. In other words, the diffusion waveguides produce crystal damage due to the photorefractive effect when light of high intensity is input to the waveguides, which raises a problem in that optical power that can be input to the waveguides is thus restricted.

Thus, a ridge waveguide having characteristics such as high resistance to optical damage, long-term reliability, and ease of device design is being researched and developed these days because a crystal bulk property can be utilized as it is. The ridge waveguide is fabricated by forming an optical waveguide having a ridge structure by subjecting one substrate of an optical element formed by bonding two substrates to thinning processing and then ridge processing. As disclosed in Non-Patent Literature 1, for example, a technique of fabricating a waveguide having a ridge structure by bonding two substrates with an adhesive agent, subjecting one of the substrates to thinning processing and then ridge processing is also known.

However, the method of attaching substrates with an adhesive agent raises a problem in that a difference in thermal expansion coefficient between the adhesive agent and the substrates produces cracks in a thin film when the temperature changes. Such a technique also raises a problem in that deterioration of the adhesive agent due to second harmonic light produced in the waveguide increases a loss in the waveguide during an operation, which deteriorates the efficiency of wavelength conversion. Furthermore, such a technique also raises a problem in that non-uniformity of the adhesive layer makes the film thickness of a single-crystal film non-uniform, leading to deviation of phase-matched wavelength of a wavelength conversion element.

As a technology that can avoid these problems, a direct bonding method is known as a technology of firmly bonding substrates without using an adhesive agent. This direct bonding method is a technique of first performing surface treatment on the substrates using a chemical, and then stacking the substrates to bond them by an inter-surface attracting force. Note that the bonding strength during bonding performed at room temperature is small, and thus, heat treatment at a high temperature is typically performed thereafter to improve the bonding strength.

The direct bonding method that can bond substrates firmly without using an adhesive agent has characteristics such as high resistance to optical damage, long-term reliability, and ease of device design. In addition, such a technique is promising also in terms of the ability of avoiding problems such as mixture of impurities and absorption of the adhesive agent or the like in light generation in the mid-infrared range through the above-described DFG. The direct bonding method is also expected to be applied not only to a nonlinear optical device, but also to an optical modulator for high power light. An oxide-based compound substrate of LN or the like has a high electrooptical constant in addition to the second-order nonlinear optical constant, and is also used widely as an optical modulator using the EO effect. In other words, optical input of high power light of more than or equal to 100 mW is difficult with a commercially available diffusion waveguide using the conventional Ti diffusion waveguide, whereas the use of the direct bonding method enables even watt-level optical input. Therefore, an optical element obtained by applying the direct bonding method can be expected to be applied to generation of an optical modulation signal having a high optical intensity, laser machining technology, and the like.

The direct bonding method requires heat treatment at a high temperature around 400° C. Thus, the substrates to be bonded are required to have thermal expansion rates close to each other in addition to good surface flatness. Thus, formation of direct bonding of substrates of similar materials such as LN and lithium tantalate LiTaO$_3$ (hereinafter denoted by LT), or direct bonding of substrates of similar materials of LN doped with an additive such as Mg, Zn, Sc, In, and Fe is being studied. Note that, in addition to the direct bonding method herein, the surface-activated room-temperature bonding method that enables the bonding process to be performed at room temperature is also known. For example, Non-Patent Literature discloses a configuration obtained by bonding a silicon Si substrate and an LT substrate by the surface-activated room-temperature bonding method to form a bonded substrate having a large refractive index difference.

FIG. 1 is a sectional view showing a basic structure of a conventional ridge waveguide 10 fabricated by the direct bonding method, as seen in a direction parallel to an end surface. With reference to FIG. 1, the ridge waveguide 10 includes a core 2 formed on an upper surface of an undercladding layer of a base substrate 1 in correspondence to a waveguide pattern. In the core 2, three side surfaces not in contact with the base substrate 1 are in contact with an air layer. This ridge waveguide 10 operates even if the upper surface and side surfaces of the core 2 are in contact with an air layer whose refractive index is equal to 1, and has a stepped refractive index distribution.

However, as a practical issue, the core 2 is exposed in the ridge waveguide 10 in the case where the upper surface and side surfaces of the core 2 are in contact with an air layer, which arises concern about changes in element properties over time due to adhesion of waste or dust flowing in the air. In order to form a film such as an antireflection film (AR coating) on an end surface of the waveguide, an overcladding layer needs to be formed in a manner further covering the core 2 so as to obtain a necessary resistance to mechanical strength.

For example, in a case where crystal of LN or LT is used for the base substrate 1 and the core 2, LiNb$_x$Ta$_{1-x}$O$_3$ (0<x<1) made of the same composition is an optimum material as the material of the overcladding layer. Thus, it is desirable to epitaxially grow the optimum material by the liquid phase epitaxy (LPE) method.

However, application of the LPE method raises a problem in that a group V element contained in a flux for use in liquid phase crystal growth of the core 2 causes optical damage to degrade element properties. Thus, formation of the overcladding layer by the LPE method has not been put into practical use.

On the other hand, another method is to use a dissimilar material for the overcladding layer. In the case of forming a dissimilar material as the overcladding layer, material compatibility of the material of the overcladding layer with the core and the undercladding layer, as well as adequacy of optical properties become problems. For the material compatibility, it is important for the dissimilar material not to chemically react with the core 2 and the undercladding layer to cause impurities to be mixed, and not to cause mechanical weakening. Requirements for the optical properties include non-occurrence of absorption or dispersion of light leaked into and guided through the overcladding layer, the ability to control a guided light mode in the core 2 by having an appropriate refractive index, and the like.

The overcladding layer of a dissimilar material can be formed of an oxide material typically represented by SiO$_2$ by the electron beam (EB) deposition method, sputtering method, plasma chemical vapor deposition (CDV) method, and the like. As an oxide having a refractive index close to that of LN which is the core 2, TiO$_2$, Ta$_2$O$_5$, nitride silicon SiN$_x$, and the like can be used.

However, the overcladding layer using a well-known dissimilar material is an amorphous material, and assuming a case of being used as the overcladding layer, some problems arise. The first problem lies in that LN as the substrate material and the oxide material represented by SiO$_2$ are significantly different in thermal expansion coefficient. While LN has a thermal expansion coefficient of $15.4 \times 10^{-6}$, SiO$_2$ has a thermal expansion coefficient of $(0.5$ to $0.6) \times 10^{-6}$, which are significantly different.

FIG. 2 includes local sectional views showing as an example a configuration obtained by forming an overcladding layer 4 of SiO$_2$ that covers the core 2 on the upper surface of the undercladding layer 3 of the base substrate 1 of the ridge waveguide 10 shown in FIG. 1. FIG. 2(a) is a local sectional view showing a manner in which a compression stress occurs in the overcladding layer 4, and FIG. 2(b) is a local sectional view showing a manner in which a tensile stress occurs in the overcladding layer 4.

With reference to FIG. 2(a) and FIG. 2(b), the thick overcladding layer 4 is herein formed on the upper surface of the undercladding layer 3 of the base substrate 1 so as to cover the core 2. In such a configuration, the difference in thermal expansion coefficient between the base substrate 1 and the core 2 may produce a compression stress as shown in FIG. 2(a) or a tensile stress as shown in FIG. 2(b) in the overcladding layer 4. Occurrence of such a stress may be a factor that causes warpage, breakage, deviation of refractive index, and the like in the waveguide that affect the light propagation performance in the core 2.

In the ridge waveguide 10 obtained by using the direct bonding method, the surface of the base substrate 1 is uneven because of the ridge structure. Thus, in order to perform electrode loading and the like further on the upper surface thereof, planarization needs to be performed. In order to perform planarization together when vapor-depositing an oxide material represented by SiO$_2$, the material of the overcladding layer 4 needs to be deposited to be sufficiently higher than the height of the core 2 which is the waveguide having the ridge structure. Then, a procedure of subjecting unevenness of the material of the overcladding layer 4 reflecting the ridge structure to planarization processing by grinding or the like is required.

The second problem lies in that the overcladding layer 4 cannot be deposited to such a degree that the ridge waveguide 10 is entirely covered because of the above-described difference in thermal expansion coefficient, and thus, it is difficult to planarize the surface of the base substrate 1 with such a technique.

Furthermore, in the overcladding layer 4 using a dissimilar material, an effective refractive index difference from the core 2 is fixed when a material to be used is determined. Thus, the third problem lies in that it is extremely difficult to control the refractive index of the overcladding layer 4 to set any effective refractive index difference.

As described above, the well-known conventional technique is problematic in that it is difficult to provide the ridge waveguide 10 with the overcladding layer 4 having good material compatibility and appropriate optical properties.

As another problem, there is also an issue resulting from a procedure of a fabrication step of a conventional periodically polarization-reversed waveguide. The fabrication step of the periodically polarization-reversed waveguide involves forming a polarization-reversed structure on a core substrate, and then diffusing proton or attaching the core substrate to a cladding layer lower in refractive index than the core substrate to provide a refractive index difference from the core substrate. Then, in a typical procedure, an optical waveguide is formed by ridge processing or the like.

However, when performing waveguide processing by dry etching or the like in a state where the polarization-reversed structure has been formed, a problem arises in that a slight difference in etching rate or the like resulting from the polarization-reversed structure causes non-uniformity in the waveguide structure. In such a case, a defect such as an increased propagation loss of the waveguide will occur. Thus, achievement of a waveguide structure to which the polarization-reversed structure can be attached properly after waveguide processing, and a technique of fabricating the waveguide structure are required.

CITATION LIST

Non-Patent Literature

Non-Patent Literature 1: Sunao Kurimura, Yuji Kato, Masayuki Maruyama, Yusuke Usui, and Hirochika Nakajima, "Quasi-phase-matched adhered ridge waveguide in LiNbO3," Appl. Phys. Lett. 89(19), 191123(2006)

Non-Patent Literature 2: Yoshikaju Zikuhara, Eiji Higurashi, Noboru Tamura, Tadatomo Suga, "Sequential activation process of oxygen RIE and nitrogen radical for LiTaO3 and Si wafer bonding," ECS Transactions, 3(6) 91-98 (2006)

SUMMARY OF THE INVENTION

The present invention was made to solve problems and issues as described above. An embodiment according to the present invention has an object to provide a highly efficient optical element in which waveguide fluctuations in correspondence to the period of a polarization-reversed structure do not occur, a propagation loss is small, and optical properties and material compatibility are favorable, as well as a method of manufacturing the optical element.

In order to achieve the above-described object, an aspect of the present invention is an optical element including a first substrate of a single-crystal and a second substrate made of a nonlinear optical medium or an electro-optic medium, the first substrate and the second substrate being bonded. The second substrate has a ridge structure formed in a light propagating direction and a periodically polarization-reversed structure formed by processing the ridge structure. A surface of the first substrate and a surface of the periodically polarization-reversed structure on the second substrate are directly bonded. The optical element further includes a thin film layer formed on a surface of the second substrate on an upper side of the periodically polarization-reversed structure.

In order to achieve the above-described object, another aspect of the present invention is a method of manufacturing an optical element including a first substrate of a single-crystal and a second substrate made of a nonlinear optical medium or an electro-optic medium, the first substrate and the second substrate being bonded. The method includes: a ridge structure forming step of forming a ridge structure on the second substrate in a light propagating direction; a periodically polarization-reversed structure forming step of processing the ridge structure to form a periodically polarization-reversed structure; a bonding step of bonding a surface of the first substrate and a surface of the periodically polarization-reversed structure on the second substrate by carrying out a direct bonding method through thermal diffusion; a grinding step of processing, by grinding, a surface of the second substrate, bonded in the bonding step, on an upper side of the periodically polarization-reversed structure into a desired thickness; and a thin film layer forming step of forming a thin film layer on a ground surface of the second substrate on the upper side of the periodically polarization-reversed structure.

By adopting the configuration or process described above, a highly efficient optical element in which waveguide fluctuations in correspondence to the period of the polarization-reversed structure do not occur, the propagation loss is small, and the optical properties and material compatibility are favorable is obtained. The reason why waveguide fluctuations do not occur in forming the waveguide is that the periodically polarization-reversed structure can be formed accurately and sophisticatedly by processing the ridge structure after forming the ridge structure. Additionally, since the substrates of similar materials are bonded by the direct bonding method through thermal diffusion, high resistance to optical damage and increased long-term reliability enable input of high-output optical power.

BRIEF DESCRIPTION OF DRAWINGS

FIG. 2 includes local sectional views showing as an example a configuration in which an overcladding layer that covers a core on the upper surface of an undercladding layer of a base substrate of the ridge waveguide shown in FIG. 1 is made of SiO$_2$, where

FIG. 4 includes perspective views showing for respective stages essential parts of a manufacturing step of a wavelength conversion element having the ridge waveguide shown in FIG. 1, where (a) is a perspective view showing a wafer which is a base material of a core substrate which is a second substrate, (b) is a perspective view of a ridge structure forming step of forming a ridge structure on the wafer of the core substrate, (c) is a perspective view of a periodically polarization-reversed structure forming step of processing the ridge structure of the wafer of the core substrate to form a periodically polarization-reversed structure, (d) is a perspective view before bonding in a bonding step of bonding the wafer of the core substrate in which the periodically polarization-reversed structure has been formed and a wafer which is a base material of a base substrate which is a first substrate, and (e) is a perspective view of a grinding step of grinding the wafer of the core substrate after the bonding step.

DESCRIPTION OF EMBODIMENTS

Hereinafter, optical elements and methods of manufacturing the optical elements according to some embodiments of the present invention will be described in detail with reference to the drawings.

First Embodiment

Figure 3:
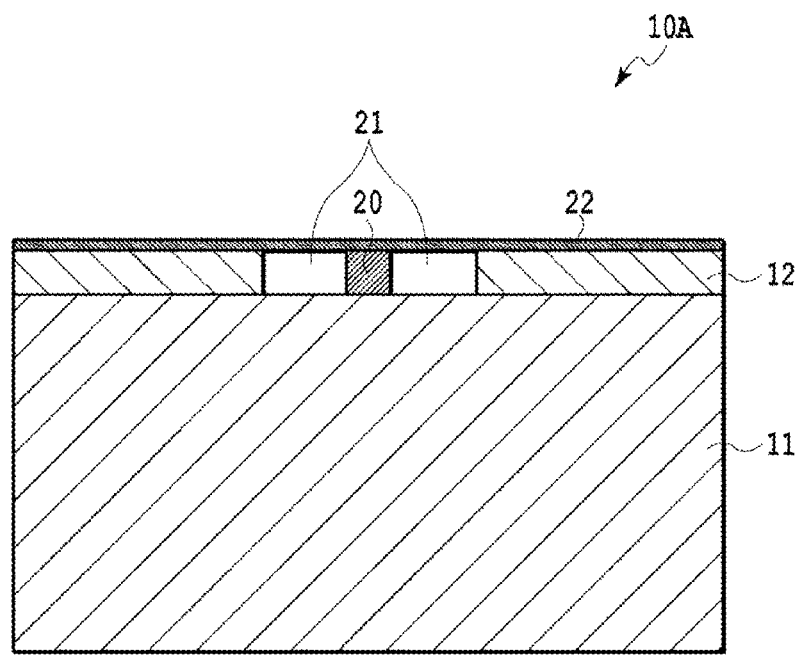
FIG. 3 is a sectional view showing a basic structure of a ridge waveguide according to a first embodiment of the present invention fabricated by the direct bonding method through thermal diffusion as seen in a direction parallel to an end surface.

FIG. 3 is a sectional view showing a basic structure of a ridge waveguide 10A according to a first embodiment of the present invention fabricated by a direct bonding method through thermal diffusion, as seen in a direction parallel to an end surface.

With reference to FIG. 3, in the ridge waveguide 10A, the base substrate 11 made of Z-cut LT serving as a first substrate of a single-crystal and a core substrate 12 made of Z-cut Zn-doped LN of a nonlinear optical medium are directly bonded. This ridge waveguide 10A is further configured to have a thin film layer 22 formed on a surface of the core substrate 12 on the upper side of a periodically polarization-reversed structure (which will be described later). The direct bonding method through thermal diffusion is applied to bonding of the base substrate 11 and the core substrate 12.

This ridge waveguide 10A also includes the core 20 formed in correspondence to the waveguide pattern on the upper surface of the undercladding layer of the base substrate 11 in the bonded state. The core 20 is formed by digging a core layer of the core substrate 12 in an unbonded state, and two side surfaces not in contact with the base substrate 11 and the thin film layer 22 in the bonded state are in contact with an air layer 21. Note that similar materials (similar single-crystal materials) are used for the undercladding layer of the base substrate 11 and the core layer of the core substrate 12. This ridge waveguide 10A also operates even if the side surfaces of the core 20 are in contact with the air layer 21 whose refractive index is equal to 1, and has a stepped refractive index distribution.

Additionally, in the ridge waveguide 10A, the core substrate 12 has a ridge structure formed in the light propagating direction by a dry etching process, and has a periodically polarization-reversed structure formed by processing the ridge structure. In the direct bonding method through thermal diffusion, the surface of the base substrate 11 and the surface of the periodically polarization-reversed structure of the core substrate 12 are bonded. A case in which a cross-sectional shape of the core 20 is a trapezoidal shape whose lower side is 5 µm, upper side is 6 µm, and height is 4 µm, and the thin film layer 22 is formed as an effective overcladding layer made of a flat plate having a thickness of 1 µm can be shown as an example. This ridge waveguide 10A becomes a wavelength conversion element (optical element) by changing the polarization-reversal period for the ridge structure of the core substrate 12, and forming a periodically polarization-reversed structure that generates light of a specific frequency band. Note that, for the core substrate 12, the nonlinear optical medium may be replaced by an electro-optic medium.

The nonlinear optical medium or electro-optic medium to be the material of the core substrate 12 should only be any one of $LiNbO_3$, $LiTaO_3$, and $LiNb_xTa_{1-x}O_3$ (where, $0 \leq x \leq 1$). Alternatively, a material obtained by doping them with at least one or more kinds selected from the group consisting of Mg, Zn, Sc, and In as an additive may be adopted.

A manufacturing step (fabrication step) of a wavelength conversion element having the ridge waveguide 10A will be described below for respective stages. FIG. 4 includes perspective views showing for respective stages essential parts of the manufacturing step of the wavelength conversion element having the ridge waveguide 10A.

FIG. 4(a) is a perspective view showing a wafer 120 which is a base material of the core substrate 12. FIG. 4(b) is a perspective view of a ridge structure forming step of forming a ridge structure on the wafer 120 of the core substrate 12. FIG. 4(c) is a perspective view of a periodically polarization-reversed structure forming step of processing the ridge structure of the wafer 120 of the core substrate 12 to form a periodically polarization-reversed structure. FIG. 4(d) is a perspective view before bonding in a bonding step of bonding the wafer 120 of the core substrate 12 on which the periodically polarization-reversed structure has been formed and a wafer 110 which is a base material of the base substrate 11. FIG. 4(e) is a perspective view of a grinding step of grinding the wafer 120 of the core substrate 12 after the bonding step.

Prior to fabrication of the wavelength conversion element, the wafer 110 of the base substrate 11 made of Z-cut LT and the wafer 120 of the core substrate 12 made of Z-cut Zn-doped LN of a nonlinear optical medium are prepared in advance. These wafers 110 and 120 are 3-inch wafers having optically-ground both surfaces. The wafer 110 of the base substrate 11 has a thickness of 500 µm, and the wafer 120 of the core substrate 12 has a thickness of 300 µm including the core layer formed on a surface to be subjected to processing. Note that similar materials (similar single-crystal materials) shall be used for the undercladding layer of the base substrate 11 and the core layer of the core substrate 12. Additionally, either one of $LiTaO_3$ and $LiNb_xTa_{1-x}O_3$ (where, $0 \leq x \leq 1$) can be used for the material of the core substrate 12, in addition to LN, as the nonlinear optical medium or electro-optic medium. Alternatively, a material obtained by doping them with at least one or more kinds selected from the group consisting of Mg, Zn, Sc, and In as an additive may be adopted, as described above.

In fabrication of the wavelength conversion element, a waveguide pattern is first fabricated on the core layer on the surface of the wafer 120 which is the base material of the core substrate 12 shown in FIG. 4(a) by a typical photolithography process. Thereafter, the surface of the wafer 120 of the core substrate 12 is subjected to dry etching processing using a dry etching device to carry out the ridge structure forming step shown in FIG. 4(b). In the ridge structure forming step, the ridge structure is formed in the light propagating direction. At this time, the core layer of the wafer 120 is dug to a depth of 4 µm by dry etching processing. In this manner, the core 20 of a trapezoidal shape having a height of 4 µm is obtained. Note that, as means for fabricating the core 20, a machining technology such as dicing can be applied in addition to dry etching processing.

Next, the periodically polarization-reversed structure forming step shown in FIG. 4(c) is carried out. In the periodically polarization-reversed structure forming step, the ridge structure of the wafer 120 is processed to form a periodically polarization-reversed structure such that phase matching conditions are satisfied in a band of a wavelength of 1.5 µm. Many studies for the technology of fabricating the periodically polarization-reversed structure on LN crystals or the like have been made, and some methods have been developed. Among them, a technique of fabricating a periodically polarization-reversed structure by an electric field application method provides a favorable result with high-reproducibility. This technique forms a periodic resist pattern on the surface of LN crystals by lithography, and a voltage pulse is applied utilizing a metal thin film electrode, liquid electrode, or the like. Polarization in a portion where the resist pattern has not been formed is thereby reversed to fabricate the periodically polarization-reversed structure.

Note that the thermal expansion coefficient in an in-plane direction of the wafer 120 of the core substrate 12 is $15.4 \times 10^{-6}$, and the thermal expansion coefficient in the in-plane direction of the wafer 110 of the base substrate 11 is $16.0 \times 10^{-6}$. In other words, the thermal expansion coefficients of the wafers 110 and 120 in the in-plane direction are very close values. Additionally, the wafer 110 of the base substrate 11 has a refractive index smaller than the refractive index of the wafer 120 of the core substrate 12.

Furthermore, the bonding step shown in FIG. 4(d) is carried out. In the bonding step, the surfaces of the wafer 120 of the core substrate 12 and the wafer 110 of the base substrate 11 are cleaned, and then the surface side of the wafer 120 that has the periodically polarization-reversed structure is stacked on and bonded to the surface side of the wafer 110. This stacking is performed in a clean atmosphere in which as few microparticles as possible are present on the two wafers 110 and 120. Then, the stacked wafers 110 and 120 are placed in an electric furnace, and the direct bonding method through diffusion is carried out by heat treatment at 400° C. to bond the two wafers 110 and 120. As a result, the wafers 110 and 120 attached by bonding do not have microparticles or the like interposed between the bonded surfaces, and are void-free, so that a crack or the like do not occur even if returned to room temperature.

Subsequently, the grinding step shown in FIG. 4(e) is carried out using a grinding device in which flatness of a grinding platen is managed. In the grinding step, the bonded wafer 120 is subjected to grinding processing until the surface on the upper side (indicating the lower side before bonding) of the periodically polarization-reversed structure is reduced to a thickness of 5 µm by grinding. The thickness of 5 µm is an example, and can be changed to a desired thickness. When performing polishing processing after grinding, a mirror ground surface can be obtained. It has been found out that when the parallelism of the wafer 120 of the core substrate is measured using an optical parallelism measuring machine, submicron parallelism can be obtained substantially all over the 3-inch wafer except a peripheral portion. Note that the parallelism of the wafer 120 indicates a difference between the maximum height and the minimum height.

This grinding step can reduce the thickness of the wafer 120 of the core substrate 12 with high accuracy. Additionally, since the wafers 110 and 120 have been attached directly by direct bonding through diffusion by heat treatment in the bonding step, a configuration having a uniform composition and film thickness through the whole area of the 3-inch wafer can be fabricated. As a result, in a case of digging the wafer 120 to a depth of 4 µm in the ridge structure forming step, the wafer 120 of a flat planar disc shape having a thickness of 1 µm can be formed on the upper surface (indicating the bottom surface before bonding) of the core 20 of a trapezoidal shape having a height of 4 µm.

Figure 5A:
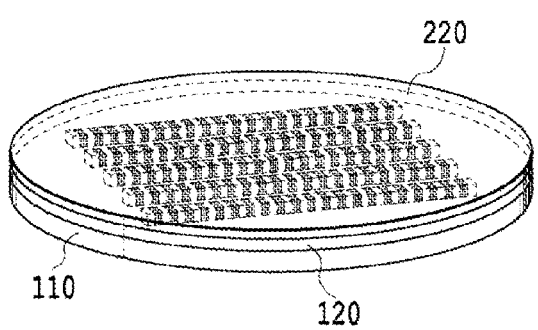
FIG. 5 includes perspective views showing for respective stages from formation of a thin film layer on the wafer after the grinding step shown in FIG. 4(e) to fabrication of chips of the wavelength conversion elements by cutting out, where (a) is a perspective view of a thin film layer forming step of forming the thin film layer on a surface of the wafer on the upper side of the periodically polarization-reversed structure after the grinding step shown in FIGS. 4(e), and (b) is a perspective view of a chip step of cutting out chips of the wavelength conversion elements from the wafer after the thin film layer forming step.
Figure 5B:
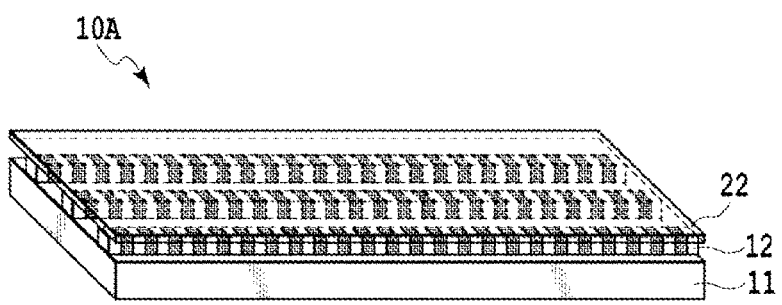

FIG. 5 includes perspective views showing for respective stages from formation of the thin film layer 220 on the wafer 120 after the grinding step shown in FIG. 4(e) to fabrication of chips of wavelength conversion elements by cutting out. FIG. 5(a) is a perspective view of a thin film layer forming step of forming the thin film layer 220 on the ground surface of the wafer 120 on the upper side of the periodically polarization-reversed structure after the grinding step shown in FIG. 4(e). FIG. 5(b) is a perspective view of a chip step of cutting out chips of the wavelength conversion elements from the wafers 110 and 120 after the thin film layer forming step. Note that although FIG. 5(a) shows the wafers 110 and 120 in the bonded state, the thin film layer 220 is formed on a flat ground surface of the wafer 120 on the upper side (indicating the lower side before bonding) of the periodically polarization-reversed structure.

After the grinding step shown in FIG. 4(e), chips of the wavelength conversion elements are fabricated. Prior to fabrication of the chips of the wavelength conversion elements, the thin film layer forming step shown in FIG. 5(a) is carried out. In the thin film layer forming step, the thin film layer 220 is formed as a flat shape on the ground surface of the wafer 120 on the upper side of the periodically polarization-reversed structure in the bonded wafers 110 and 120 after the above-described grinding step. This thin film layer 220 can be regarded as an overcladding layer as compared with the undercladding layer of the wafer 110. In other words, after carrying out the thin film layer forming step, a 3-inch wafer in which the overcladding layer has been loaded on the surface on the upper side of the periodically polarization-reversed structure (ridge structure) is fabricated.

Thus, in fabrication of chips of the wavelength conversion elements, the chip step shown in FIG. 5(b) is carried out. In the chip step, the bonded wafers 110 and 120 are cut out as chips in the form of strips by dicing such that a desired number of ridge structures as the periodically polarization-reversed structures have a desired length, and both end surfaces are optically ground. Note that the both end surfaces herein indicate the short-side direction of the chips. In this manner, chips of the wavelength conversion elements each having the ridge waveguide 10A are completed.

With the ridge waveguide 10A according to the first embodiment, single-crystal materials are adopted considering the compatibility between the materials of the base substrate 11 and the core substrate 12, and after forming the ridge structure, the ridge structure is processed to form the periodically polarization-reversed structure accurately and sophisticatedly. Thus, a highly efficient wavelength conversion element (optical element) is obtained in which waveguide fluctuations in correspondence to the period of the polarization-reversed structure do not occur, the propagation loss is small, and the optical properties and material compatibility are favorable. It has been recognized that the wavelength conversion element having the ridge waveguide 10A is improved in wavelength conversion efficiency by approximately several tens of percent. Additionally, since the ability to simultaneously form the thin film layer (the overcladding layer) having a flat structure on the surface (the ground surface) on the upper side of the periodically polarization-reversed structure facilitates electrode formation for obtaining a thermooptical effect or an electro-optic effect.

Furthermore, in the ridge waveguide 10A according to the first embodiment, substrates of similar single-crystal materials are bonded by the direct bonding method through thermal diffusion. Thus, high resistance to optical damage and increase in long-term reliability enable input of high-output optical power. Additionally, the manufacturing method described in the first embodiment is applied to change the polarization-reversal period for the ridge structure of the ridge waveguide 10A, thereby fabricating a wavelength conversion element having a periodically polarization-reversed structure for generating mid-infrared light, visible light, and ultraviolet light. As a result, it has been found out that any wavelength conversion element can perform wavelength conversion favorably.

Second Embodiment

Figure 6:
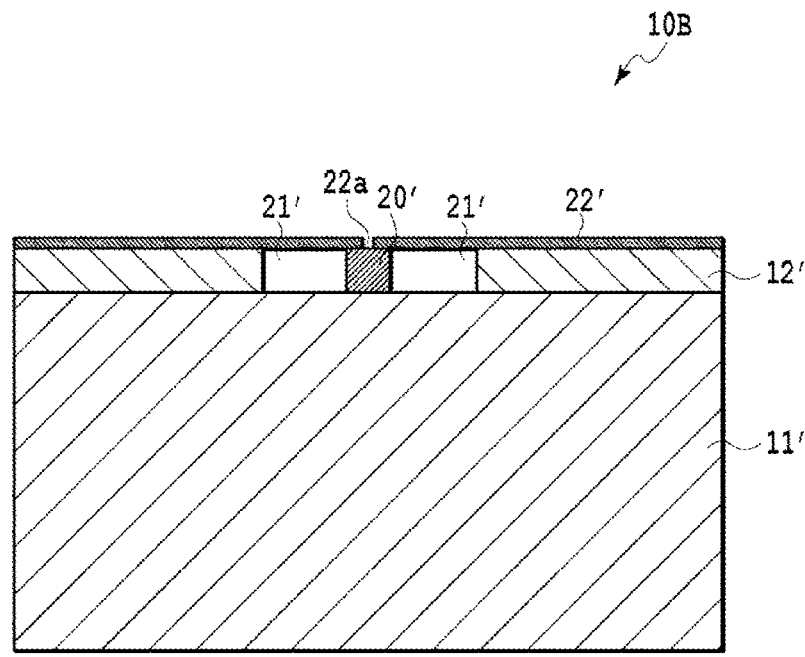
FIG. 6 is a sectional view showing a basic structure of a ridge waveguide according to a second embodiment of the present invention fabricated by the direct bonding method through thermal diffusion, as seen in a direction parallel to an end surface.

FIG. 6 is a sectional view showing a basic structure of a ridge waveguide 10B according to a second embodiment of the present invention fabricated by the direct bonding method through thermal diffusion, as seen in a direction parallel to an end surface. This ridge waveguide 10B is different from the ridge waveguide 10A in that a base substrate 11' is made of a rock crystal material, and a groove structure 22a for controlling the thickness is formed in part of a thin film layer 22' varying in thickness. Although another difference lies in that an air layer 21' is formed between the bonded base substrate 11' and a core substrate 12' having a core 20' different in size from the core 20, the basic structure is substantially identical to that in the case of the ridge waveguide 10A. Note that the material of the core substrate 12' shall be identical to that in the case of the first embodiment.

The groove structure 22a formed in this thin film layer 22' improves the possible submicron thickness accuracy in the grinding step to allow the effective refractive index to be adjusted. This allows the thickness of the thin film layer 22' which will be an overcladding layer of a material similar to that of the core 20' to be controlled with high accuracy, and allows the effective refractive index difference to be set appropriately. The following will describe a technological consideration process until effectiveness of the groove structure 22a for this thickness control is found out.

In other words, for the ridge waveguide 10A according to the first embodiment, the case of using similar materials (similar single-crystal materials) for the undercladding layer of the base substrate 11 and the core layer of the core substrate 12 has been described. However, in the case of boning substrates of similar single-crystal materials in this manner, the refractive index difference between the substrates cannot be made large. Thus, the configuration in which the substrates of similar single-crystal materials are bonded weakens light confinement and restricts size reduction of the waveguide, so that there is a limit on achievement of a highly efficient wavelength conversion element. In a conventional waveguide formed by direct bonding through thermal diffusion, the refractive index difference between the core layer and the overcladding layer is approximately 0.5 to 0.7%, and even if the waveguide is reduced in size, the cross-sectional shape of the core that can be achieved is merely approximately 5×5 μm$^2$. Unless the refractive index difference between the core layer and the overcladding layer is at least more than or equal to 1%, further size reduction of the waveguide is difficult.

In fabrication of the waveguide by the direct bonding method, the following two techniques are known as bonding technologies that can make the refractive index difference large. One is a technique of bonding substrates of dissimilar materials by a surface-activated room-temperature bonding method. The other one is a technique of forming an amorphous material such as glass as a bonding layer between the core layer and the base substrate to obtain an undercladding layer.

As disclosed in Non-Patent Literature 2, the former surface-activated room-temperature bonding method allows the bonding process to be performed at room temperature, and by subjecting the bonded surfaces to surface treatment under vacuum, brings surface atoms into an active state to be easily formed by chemical binding. The use of such surface treatment enables bonding at room temperature or significant reduction of the temperature in heat treatment thereafter. Non-Patent Literature 2 discloses a configuration in which a silicon Si substrate and an LT substrate are bonded by the surface-activated room-temperature bonding method to form a bonded substrate having a large refractive index difference.

However, since the substrates of single-crystal materials of LN and LT relevant to the first embodiment are subjected to a waveguide fabrication process such as dry etching, removal of oxygen in the crystals occur, and a defect occurs. In a case where such a defect is present, the propagation loss of the waveguide increases, and the resistance to optical damage also deteriorates. Thus, after experiencing the waveguide fabrication process, anneal treatment is required to complement oxygen removed from the crystals. However, bonding of the silicon Si substrate and the LT substrate by the surface-activated room-temperature bonding method raises a problem in that the bonded substrates are damaged in anneal treatment because of a large difference in thermal expansion rate between the substrates. Therefore, the surface-activated room-temperature bonding method disclosed in Non-Patent Literature 2 is not applicable to bonding of substrates made of similar single-crystal materials targeted for bonding in the first embodiment.

The latter technique of using an amorphous material for a bonding layer can increase the effective refractive index difference of the waveguide when an amorphous material smaller in refractive index than the core layer of the core substrate and the base substrate is used as the undercladding layer. Since bonding is performed using thermal diffusion similarly to the typical direct bonding method, the problem in which substrates are broken during the anneal treatment as in the latter technique does not arise.

However, in the case of using an amorphous material as the bonding layer, non-uniformity of the film thickness of the bonding layer may make the film thickness of the core layer non-uniform. This raises a problem in that the phase-matched wavelength of the wavelength conversion element is also made non-uniform through the entire element length. Another problem arises in that, since it is also difficult to control the refractive index of the amorphous material itself, the average value itself of the phase-matched wavelength also deviates from a design value. Furthermore, when the amorphous material is used, the array of surface molecules of the bonded surfaces is random, and the number of effective valences per unit area is smaller than in the direct bonding of crystals. Thus, problems of a weak bonding strength and lack of long-term reliability arise. Additionally, an increase of process steps for forming the bonding layer increases property fluctuations per process. Under such circumstances, it is also difficult to apply the latter technique to bonding of substrates of similar single-crystal materials targeted for bonding in the first embodiment.

For fabrication of the waveguide by the direct bonding method, bonding of crystals that enable heat treatment and have stable optical properties is considered suitable. Thus, when using LN for the core layer, rock crystal is conceivable as a material usable for a substrate that can be subjected to heat treatment by the direct bonding method. A processing technology for rock crystal has been established, and a wafer having a good surface flatness can be obtained. Additionally, the thermal expansion coefficient of rock crystal in the in-plane direction is $13.2\times10^{-6}$, which is a value very close to the thermal expansion coefficient of $15.4\times10^{-6}$ of LN in the in-plane direction. From these reasons, rock crystal can be said to be a crystal that can be sufficiently subjected to heat treatment by the direct bonding method with LN.

Figure 1:
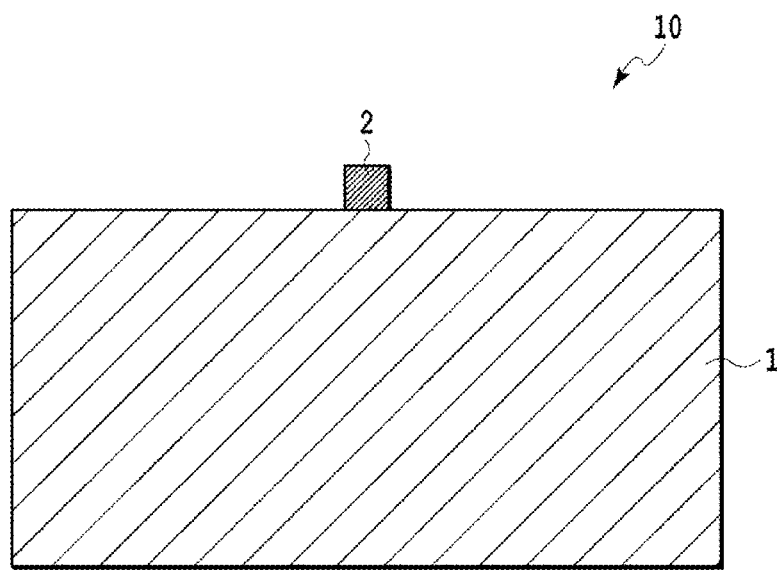
FIG. 1 is a sectional view showing a basic structure of a conventional ridge waveguide fabricated by a direct bonding method, as seen in a direction parallel to an end surface.
Figure 2A:
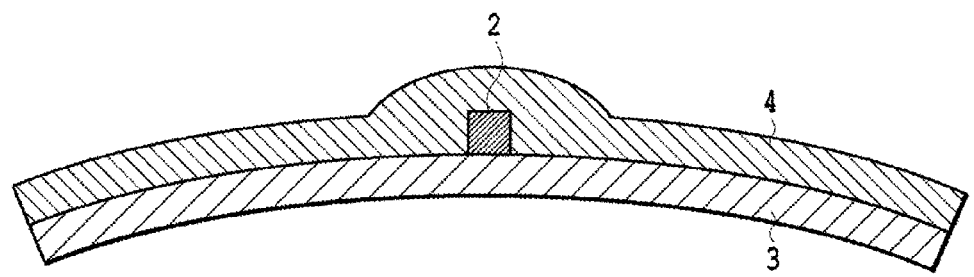
FIG. 2(a) is a local sectional view showing a manner in which a compression stress occurs in the overcladding layer.
Figure 2B:
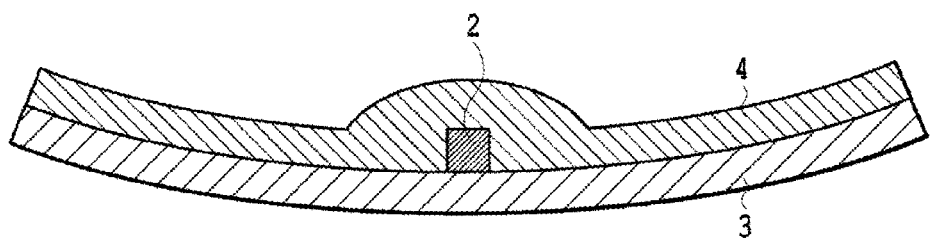
FIG. 2(b) is a local sectional view showing a manner in which a tensile stress occurs in the overcladding layer.

Thus, assume a case in which the base substrate 1 is rock crystal, and the core 2 made of Z-cut Zn-doped LN provided with the periodically polarization-reversed structure are formed in the structure of the ridge waveguide 10 shown in FIG. 1, for example. In such a case, it has been found out that a specific refractive index difference of the ridge waveguide 10 is approximately 28%, which is very large. Thus, light confinement in the core 2 is very strong, and even if the cross-sectional shape of the core 2 is less than or equal to $5\times5$ $\mu m^2$, a waveguide in a multimode is obtained. For achieving a highly efficient wavelength conversion element, an interaction length of light needs to be increased in principle, in addition to increasing the power density of light in the core 2. Light incident upon the core 2 in the wavelength conversion element desirably excites only a ground mode of the waveguide. In the excited state in the multimode, overlapping of photofields of signal light and excitation light is poor, and the interaction between the signal light and excitation light is reduced, so that the efficiency of the nonlinear optical effect deteriorates.

In order to excite only the ground mode in the wavelength conversion element of the above-described ridge waveguide 10, the cross-sectional shape of the core 2 needs to be approximately $1\times1$ $\mu m^2$. However, the feasibility of such a waveguide-size element is extremely low considering actual fabrication accuracy. Thus, the effective refractive index difference between the overcladding layer and the core layer needs to be adjusted appropriately using the overcladding layer. In such a case, however, a problem arises in that it is difficult to provide any refractive index difference using a material dissimilar to that of the core layer of the core substrate for the overcladding layer, as described above. Additionally, by using an overcladding layer of a material similar to that of the core layer of the core substrate if the thickness is appropriate, leakage of an electric field to portions of similar materials can increase the effective refractive index, as in a rib-type waveguide, for example. However, the issue that it is extremely difficult to control the thickness of the overcladding layer also remains in this case.

Thus, in the case of using an overcladding layer of a material similar to that of the core layer of the core substrate considered difficult, the inventors of the present invention have paid attention to a technique that enables control over the thickness of the overcladding layer. As a result of carrying out various studies, devices, and the like, it has been found out that the problems can be solved if the material of the base substrate is rock crystal, and a groove structure for controlling the effective refractive index is provided in part of the thin film layer which will be the overcladding layer in the ridge waveguide. This groove structure allows the effective refractive index difference to be adjusted appropriately, and allows the thickness of the thin film layer to be controlled.

In the ridge waveguide 10B according to the second embodiment shown in FIG. 6, the base substrate 11' made of rock crystal which is the first substrate and the core substrate 12' made of Z-cut Zn-doped LN which is a nonlinear optical medium are directly bonded. Herein, the direct bonding method through thermal diffusion can also be applied to bonding. This ridge waveguide 10B further has the thin film layer 22' formed on the surface of the core substrate 12' on the upper side of the periodically polarization-reversed structure, and has the groove structure 22a provided at a position to be the center of the core 20' in the thin film layer 22'.

This ridge waveguide 10B also includes the core 20' formed on the upper surface of the undercladding layer of the base substrate 11' in the bonded state in correspondence to the waveguide pattern. The core 20' is formed by digging the core layer of the core substrate 12' in the unbonded state, and two side surfaces not in contact with the base substrate 11' and the thin film layer 22' in the bonded state are in contact with the air layer 21'. This ridge waveguide 10B also operates even if the side surfaces of the core 20' are in contact with the air layer 21' whose refractive index is equal to 1, and has a stepped refractive index distribution.

Additionally, in the ridge waveguide 10B, the core substrate 12' has the ridge structure formed in the light propagating direction by the dry etching process, and also has a periodically polarization-reversed structure formed by processing the ridge structure. In the direct bonding method through thermal diffusion, the surface of the base substrate 11' and the surface of the periodically polarization-reversed structure of the core substrate 12' are bonded. A case in which the cross-sectional shape of the core 20' is a trapezoidal shape whose lower side is 2 µm, upper side is 3 µm, and height is 1.5 µm, and the thin film layer 22' is formed as an effective overcladding layer provided with the groove structure 22a made of a flat plate having a thickness of 1.5 µm can be shown as an example.

The groove structure 22a for controlling the effective refractive index has a form in which the single groove structure having a depth of 1 µm and a width of 1.5 µm is arranged at the center of the core 20'. Note that the size, number, and arrangement of the groove structure(s) 22a should only be appropriately selected and changed depending on the size of the core 20' and a target effective refractive index. In other words, also in the case of this ridge waveguide 10B, the wavelength conversion element (optical element) is obtained.

The step (fabrication step) of the wavelength conversion element having this ridge waveguide 10B is substantially similar to that in the case of the first embodiment, while it is only sufficient to add a groove structure forming step which will be described below after the grinding step, and to perform the thin film layer forming step thereafter. In other words, in the groove structure forming step, a mask pattern is formed in advance at a place corresponding to part of the thin film layer 22' on the ground surface of the core substrate 12' after the grinding step, and then the surface of the ground surface is etched to form the groove structure 22a for thickness control. If the thin film layer forming step is carried out thereafter, the thin film layer 22' can be formed such that the groove structure 22a is formed in the part.

The groove structure 22a formed in the thin film layer 22' of the ridge waveguide 10B can improve possible submicron thickness accuracy in the grinding step further by one digit, and can adjust the effective refractive index equivalent to an accuracy of several tens of nanometers. As a result, the thickness of the thin film layer 22' which will be the overcladding layer of the material similar to that of the core layer can be controlled with high accuracy, and the effective refractive index difference can be set appropriately.

Third Embodiment

Figure 7:
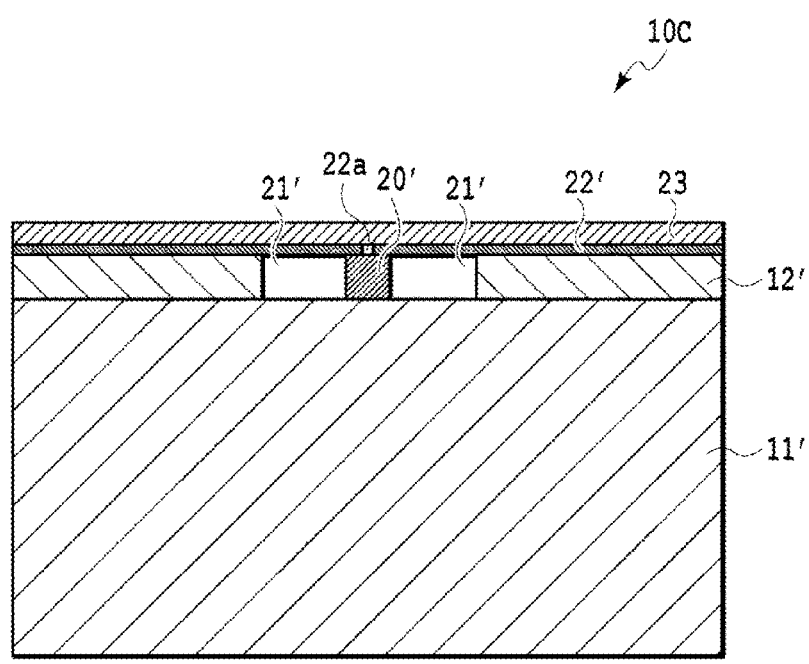
FIG. 7 is a sectional view showing a basic structure of a ridge waveguide according to a third embodiment of the present invention fabricated by the direct bonding method through thermal diffusion, as seen in a direction parallel to an end surface.

FIG. 7 is a sectional view showing a basic structure of a ridge waveguide 10C according to a third embodiment of the present invention fabricated by the direct bonding method through thermal diffusion, as seen in a direction parallel to an end surface. This ridge waveguide 10C is different from the ridge waveguide 10B in that the ridge waveguide 10C is formed to embed the groove structure 22a in the upper surface of the thin film layer 22' and achieve planarization, and has a protection layer 23 made of an oxide having a refractive index close to that of the core 20' of the core substrate 12'. Note that herein the ridge waveguide 10C will also be a wavelength conversion element (optical element), and the material of the core substrate 12' shall be the same as that in the case of the first embodiment.

The step (fabrication step) of the wavelength conversion element having this ridge waveguide 10C is substantially similar to that in the case of the second embodiment, while it is only sufficient to carry out the protection layer forming step after the groove structure forming step. In the protection layer forming step, the protection layer 23 made of an oxide having a refractive index close to that of the core 20' of the core substrate 12' is formed so as to embed the groove structure 22a in the upper surface of the thin film layer 22' and achieve planarization. The protection layer 23 should only embed the groove structure 22a as an oxide material having a refractive index close to that of LN of the core 20' than to air in the air layer 21', and can be regarded as an overcladding layer that can control the effective refractive index of the thin film layer 22' after the groove structure forming step.

A case in which $TiO_2$ is deposited on the upper surface of the thin film layer 22' using the typical sputtering method as the oxide material of the protection layer 23 can be shown as an example. In addition to application of the typical sputtering method, electron beam (EB) deposition method and the plasma chemical vapor deposition (CVD) method can be applied. Additionally, $Ta_2O_5$, nitride silicon $SiN_x$, silicon oxide $SiO_x$, and the like can be used for the oxide material of the protection layer 23, in addition to $TiO_2$. Note that the protection layer 23 formed in the protection layer forming step is also effective for a role of complementing the mechanical strength in addition to controlling the effective refractive index of the thin film layer 22'.

Furthermore, a configuration can be adopted in which the protection layer forming step described herein is performed after the grinding step in the first embodiment or the second embodiment to provide a protection layer so as to cover the upper surface of the core 20/20'. At this time, the air layer 21/21' may be embedded, and the selection should only be performed paying attention to the points that the optical properties and the material compatibility are not impaired, and high efficiency is achieved.

When such a procedure is employed, a configuration is obtained in which the thin film layer 22 is formed on the upper surface of the protection layer in the case of the first embodiment. Thus, there are no problems in the optical properties and the material compatibility, and high efficiency is ensured. In the case of second embodiment, a configuration is obtained in which the protection layer is present on the upper surface of the core 20', and the thin film layer 22' having the groove structure 22a in the upper surface of the protection layer is formed. Although there are no problems in the optical properties and the material compatibility in this configuration as well, a configuration may be adopted in which the protection layer forming step is carried out further to provide the protection layer so as to embed the groove structure 22a in the upper surface of the thin film layer 22'.

The invention claimed is:

1. An optical element comprising:
a first substrate of a single-crystal; and
a second substrate made of a nonlinear optical medium or an electro-optic medium, the first substrate and the second substrate being bonded, wherein
the second substrate has a ridge structure formed in a light propagating direction and a periodically polarization-reversed structure formed by processing the ridge structure,
a surface of the first substrate and a surface of the periodically polarization-reversed structure on the second substrate are directly bonded, and
the optical element further includes a thin film layer formed on a surface of the second substrate on an upper side of the periodically polarization-reversed structure, and
a third substrate having a first side contacting the thin film layer, a second side contacting the first substrate, and third and fourth sides that contact an air layer that is between the second and third substrates.

2. The optical element according to claim 1, wherein a groove structure for thickness control is formed in part of the thin film layer.

3. The optical element according to claim 2, including a protection layer formed to embed the groove structure in an upper surface of the thin film layer and achieve planarization, the protection layer being made of an oxide having a refractive index close to a refractive index of a core of the second substrate.

4. The optical element according to claim 3, wherein the nonlinear optical medium or the electro-optic medium of the second substrate is any one of $LiNbO_3$, $LiTaO_3$, and $LiNb_xTa_{1-x}O_3$ ($0 \leq x \leq 1$), or a material obtained by doping them with at least one or more kinds selected from the group consisting of Mg, Zn, Sc, and In as an additive.

5. The optical element according to claim 2, wherein the nonlinear optical medium or the electro-optic medium of the second substrate is any one of $LiNbO_3$, $LiTaO_3$, and $LiNb_xTa_{1-x}O_3$ ($0 \leq x \leq 1$), or a material obtained by doping them with at least one or more kinds selected from the group consisting of Mg, Zn, Sc, and In as an additive.

6. The optical element according to claim 1, wherein the nonlinear optical medium or the electro-optic medium of the second substrate is any one of $LiNbO_3$, $LiTaO_3$, and $LiNb_xTa_{1-x}O_3$ ($0 \leq x \leq 1$), or a material obtained by doping them with at least one or more kinds selected from the group consisting of Mg, Zn, Sc, and In as an additive.

7. A method of manufacturing an optical element including a first substrate of a single-crystal and a second substrate made of a nonlinear optical medium or an electro-optic medium, the first substrate and the second substrate being bonded, the method comprising:
   a ridge structure forming step of forming a ridge structure on the second substrate in a light propagating direction;
   a periodically polarization-reversed structure forming step of processing the ridge structure to form a periodically polarization-reversed structure;
   a bonding step of bonding a surface of the first substrate and a surface of the periodically polarization-reversed structure on the second substrate by carrying out a direct bonding method through thermal diffusion;
   a grinding step of processing, by grinding, a surface of the second substrate, bonded in the bonding step, on an upper side of the periodically polarization-reversed structure into a desired thickness;
   a thin film layer forming step of forming a thin film layer on a ground surface of the second substrate on the upper side of the periodically polarization-reversed structures; and
   a groove structure forming step of forming a mask pattern in advance at a place corresponding to part of the thin film layer on the ground surface of the second substrate after the grinding step, and then etching a surface of the ground surface to form a groove structure for thickness control, wherein
   in the thin film layer forming step, the thin film layer is formed such that the groove structure is formed in the part.

8. The method of manufacturing an optical element according to claim 7, including a protection layer forming step of forming a protection layer made of an oxide having a refractive index close to a refractive index of a core of the second substrate so as to embed the groove structure in an upper surface of the thin film layer and achieve planarization.

9. The method of manufacturing an optical element according to claim 8, wherein the nonlinear optical medium or the electro-optic medium of the second substrate is any one of $LiNbO_3$, $LiTaO_3$, and $LiNb_xTa_{1-x}O_3$ ($0 \leq x \leq 1$), or a material obtained by doping them with at least one or more kinds selected from the group consisting of Mg, Zn, Sc, and In as an additive.

10. The method of manufacturing an optical element according to claim 7, wherein the nonlinear optical medium or the electro-optic medium of the second substrate is any one of $LiNbO_3$, $LiTaO_3$, and $LiNb_xTa_{1-x}O_3$ ($0 \leq x \leq 1$), or a material obtained by doping them with at least one or more kinds selected from the group consisting of Mg, Zn, Sc, and In as an additive.

11. An optical element comprising:
   a first substrate of a single-crystal; and
   a second substrate made of a nonlinear optical medium or an electro-optic medium, the first substrate and the second substrate being bonded, wherein
   the second substrate has a ridge structure formed in a light propagating direction and a periodically polarization-reversed structure formed by processing the ridge structure,
   a surface of the first substrate and a surface of the periodically polarization-reversed structure on the second substrate are directly bonded, and
   the optical element further includes a thin film layer formed on a surface of the second substrate on an upper side of the periodically polarization-reversed structure,
   wherein a groove structure for thickness control is formed in part of the thin film layer, and
   wherein a protection layer is formed to embed the groove structure in an upper surface of the thin film layer and achieve planarization, the protection layer being made of an oxide having a refractive index close to a refractive index of a core of the second substrate.

12. The optical element according to claim 11, wherein the nonlinear optical medium or the electro-optic medium of the second substrate is any one of $LiNbO_3$, $LiTaO_3$, and $LiNb_xTa_{1-x}O_3$ ($0 \leq x \leq 1$), or a material obtained by doping them with at least one or more kinds selected from the group consisting of Mg, Zn, Sc, and In as an additive.

* * * * *